April 28, 1936.  T. J. BYRNES  2,038,824
TROLLEY RIVET
Filed March 27, 1934
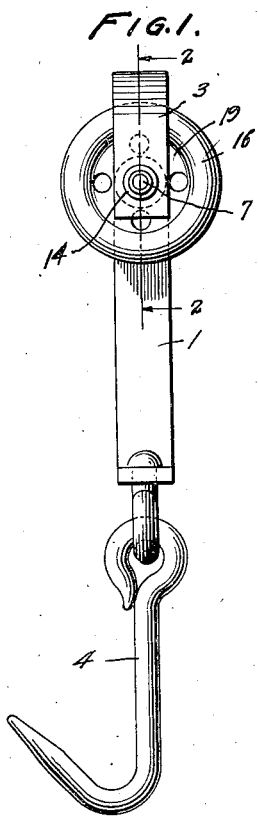
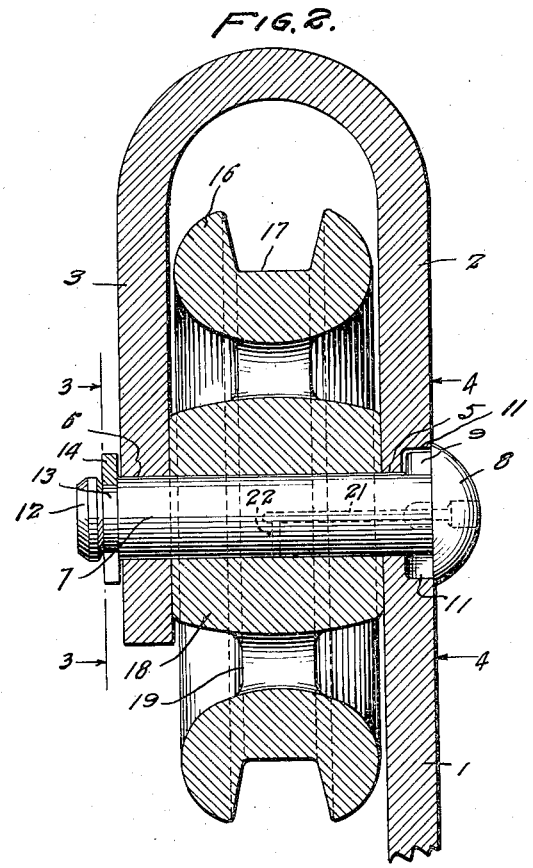
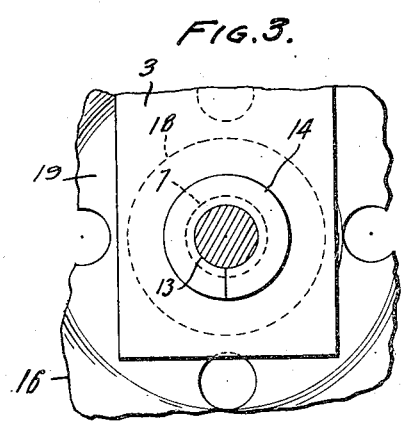
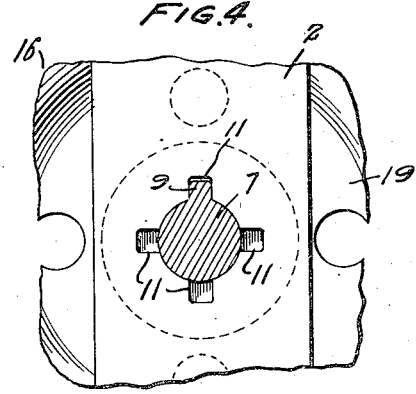
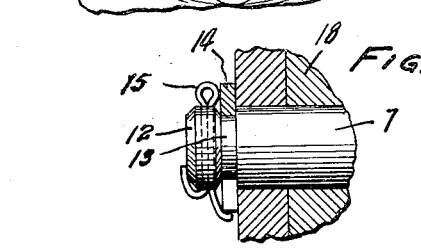
Inventor
THOMAS. J. BYRNES
By Semmes & Semmes
Attorneys Patented Apr. 28, 1936

2,038,824

UNITED STATES PATENT OFFICE 2,038,824

TROLLEY RIVET

Thomas J. Byrnes, Omaha, Nebr.

Application March 27, 1934, Serial No. 717,643

2 Claims. (Cl. 105—150)

This invention relates to trolleys and more particularly has reference to a trolley adapted for use in a packing house for the suspension and conveyance of animals prior to, during, and subsequent to slaughter.

The trolleys heretofore employed have been open to certain serious objections. These prior trolleys have in general comprised a yoke member provided with a rivet extending therethrough and upon which the wheel was journalled. At the time of assembling the several elements, the rivet was heated, and after insertion through the yoke and wheel the free end was flattened in order to lock the rivet within the yoke. Such assembly required the services of a blacksmith and was relatively complicated. Likewise, when it was necessary to replace one of the elements, it was necessary to send the trolley to a blacksmith shop where the rivet had to be cut out of the yoke.

Furthermore, the serviceability of the prior pulleys was of relatively short duration. This resulted from poor lubrication but principally from the fact that the rivets were rotatable within the yoke, and the bearing thus provided was limited. Consequently there was excessive wear at such bearing points.

Again, difficulties were experienced in the operation of these previous pulleys. They were particularly subject to misalignment between the wheel and yoke, and this resulted from the wear which occurred at the bearing points as above mentioned. Also, the method of replacing worn parts contributed to such misalignment.

Under many conditions of operation the above disadvantages, and particularly misalignment, would not have been serious. However, in a pulley for the suspension and conveyance of animals, these disadvantages are most pronounced. Obviously the center of gravity of the supported carcass is located well below the rail, and slight irregularities in the construction of the pulley seriously interferes with the operations in the slaughtering room. Misalignment between the wheels and other elements would result in the binding and sticking of the wheels and the yokes. Furthermore, the trolleys would slide at curves and on switches, and would frequently leave the tracks completely.

To overcome the above objections, and others inherent in the prior art is one of the objects of my invention.

Another object of my invention is to provide a trolley that may be readily assembled, disassembled, and repaired, as occasion demands.

Yet another object of my invention is to provide a trolley in which binding or sticking of the wheels in the yokes is prevented.

A still further object of my invention is to provide a trolley which satisfactorily operates over a long period of time.

To accomplish the above, and other important objects, my invention in general comprises the parts and combinations to be hereinafter set forth and claimed, with the understanding that the several necessary elements comprising my invention may be varied in construction, proportions and arrangement, without departing from the spirit and scope of the appended claims.

To facilitate a comprehension of my invention reference is made to the accompanying drawing in which one specific embodiment is depicted, it being distinctly understood, however, that various modifications may be made therein without exceeding the spirit and scope of my invention.

In the drawing, in which corresponding numerals refer to the same parts—

Figure 1 is a side elevational view of my invention;

Figure 2 is a vertical sectional view along line 2—2 of Figure 1;

Figure 3 is a sectional view along line 3—3 of Figure 2, looking in the direction of the arrows;

Figure 4 is a view along line 4—4 of Figure 2, looking in the direction of the arrows;

Figure 5 is a detail view of a modified form of locking means.

In Figure 1 I have shown a conventional form of yoke 1, which is bent to form arm members 2 and 3. At the lower end of the yoke a hook 4 is provided to engage a chain or other grappling means for the carcass.

Oppositely disposed in the arms 2 and 3 are round holes 5 and 6, respectively. These two holes are adapted to receive a rivet member 7, and inasmuch as the rivet is prevented from rotation the holes 5 and 6 are preferably drilled to afford a relatively close fit with the rivet.

The rivet 7 is provided with a head 8, and from the flat surface of the head 8 there extends along the longitudinal axis of the rivet a lug 9. On the exposed face of arm 2 and connected with the hole 5, there are drilled a plurality of recesses 11. The recesses 11 are the same size as the lug 9 and are adapted to receive the lug 9 so that the flat face of the head 8 may lie against the arm 2. It will be appreciated that the lug 9 and the recesses 11 serve to prevent rotation of the rivet 7 within the yoke.

The free end of the rivet 7 is tapered as at 12, and an annular channel 13 is provided adjacent the tapered section. The channel 13 is adapted to receive a suitable locking means, preferably a split washer 14, to prevent removal of the rivet from the yoke. Although not essential, I prefer that the outer wall of the channel 13 be sloped as shown in Figure 2.

It will be appreciated that inasmuch as the rivet 7 is not rotated with respect to the yoke 1, there is no journal surface between the two members and consequently no opportunity for wear. The facility with which the rivet 7 is assembled in the yoke is believed to be readily apparent. The rivet 7 is merely inserted through the apertures 5 and 6, and turned so that the lug 9 registers with one of the recesses 11. When the head 8 lies against the arm 2 the washer 14 is slipped over the free end of the rivet until it rests within channel 13.

The sloping character of the end 12 facilitates the positioning of the washer within the channel, and likewise the sloping side of channel 14 permits of the ready removal of the washer. As a matter of fact a slight tap on the free end of the rivet suffices to remove the washer from the channel, and even if the wall of the channel should be straight, in lieu of slanting, the washer may be easily removed by merely opening it by the use of a screw driver, chisel, or some similar instrument. In any event, no complicated mechanical equipment is necessary, nor is it necessary to send the trolley to a blacksmith shop. The entire assembly and disassembly of the trolley unit may be accomplished in the slaughtering rooms.

Although I have not found it necessary, I have shown in Figure 5 a way of more positively securing the washer 14 upon the rivet. To accomplish this I merely insert a cotter pin 15 through a suitable hole drilled in the end of the rivet 7. Such a cotter pin serves to securely hold the washer in the channel 13 but, as stated, I have not found such an additional element necessary.

There is shown in Figures 1 and 2 the trolley wheel. This wheel is made up of a rim portion 16 provided with an annular groove 17 in which the track is adapted to fit. The rim 16 is joined to a hub 18 by means of a spider 19. It will be observed that the hub 18 is journaled on the rivet 7 in relatively close fit in order to prevent any radial movement of rocking with respect to the rivet. It will also be noted that the hub 18 is in relatively close fit with the arms 2 and 3 of the yoke in order to prevent axial movement of the wheel on the rivet 7.

In order to facilitate lubrication of the moving parts I have provided a lubricating duct 21 which extends from the head 8 to approximately the center of the hub 18. The duct 21 is in communication with a duct 22 which extends to the periphery of the rivet to thereby lubricate the wheel 8 upon its rotation about the pivot. The ducts 21 and 22 are of a size sufficient to afford adequate lubrication, but not so large that the lubricant flows therethrough by gravity. Therefore, the duct 22 need not necessarily extend downwardly from the duct 21.

It will be appreciated that by the provision of a plurality of recesses 11, the rivet 7 may be rotated to a corresponding number of operative positions, and locked in the desired position. This results in increased life for the rivet. Inasmuch as the principal friction between the rivet 7 and hub 18 occurs along the under side of the rivet, the rivet may be rotated from time to time in order to compensate for such wear.

The advantages of my invention are believed to be readily apparent from the foregoing. The facility with which it may be assembled and disassembled for repair purposes constitutes a decided advance over the pulleys heretofore used. Only a fraction of time is required for such operations, and they can be carried out by any laborer, thus obviating the necessity of sending the pulley to a blacksmith shop.

Furthermore, it will be noted that the only relatively moving areas are the interior of the hub 18 and the corresponding section of the rivet 7. This affords a comparatively broad bearing surface and consequently reduces the resulting wear correspondingly. The rivet 7 is maintained stationary with respect to the arms 2 and 3, and consequently the wear between these elements is avoided. Because of the wear between the rivet and yoke in the prior devices, the wheels in such devices were particularly subject to misalignment and binding with the yoke. These objections are overcome in my device by preventing the rotation of the rivet 7.

Inasmuch as there are only two relatively movable elements in my invention lubrication of the moving parts can be better accomplished. Furthermore the provision of ducts 21 and 22 facilitates the lubrication of the necessary parts.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:—

1. A trolley comprising a yoked member, a wheel adapted to run on a track, a rivet provided with a flattened head and adapted to extend through both arms of the yoke to serve as a bearing for the wheel, a lug on the rivet adjacent the head, a plurality of recesses in the yoke adapted to receive the lug to prevent rotation of the rivet, an annular channel on the end of the rivet opposite the head, a washer adapted to fit in the channel and maintained therein by a cotter pin, and a lubricating duct extending from one end of the rivet to the center of the wheel bearing.

2. A trolley comprising a yoked member, aligned apertures in the arms of the yoked member, a wheel adapted to run on a track, a rivet provided with a flattened head and adapted to extend through the apertures in the yoked member to serve as a bearing for the wheel, a lug on the rivet adjacent the head, radial recesses spaced 90 degrees apart in one of the arms of the yoke and adapted to receive the lug to prevent rotation of the rivet and hold the rivet non-rotative in a plurality of positions, an annular channel on the end of the rivet opposite the head, a washer adapted to fit in the channel and maintained therein by a cotter pin, and a lubricating duct extending from the flattened head portion of the rivet to the center of the wheel bearing.

THOMAS J. BYRNES.